(12) United States Patent
Hagny et al.

(10) Patent No.: US 9,930,822 B2
(45) Date of Patent: Apr. 3, 2018

(54) MOUNTING STRUCTURE FOR DOWN-PRESSURE SYSTEM FOR OPENER ASSEMBLY OF AGRICULTURAL IMPLEMENT

(71) Applicants: Matthew P Hagny, Bel Aire, KS (US); Jeffrey Alan Harris, Salina, KS (US)

(72) Inventors: Matthew P Hagny, Bel Aire, KS (US); Jeffrey Alan Harris, Salina, KS (US)

(*) Notice: Subject to any disclaimer, the term of this patent is extended or adjusted under 35 U.S.C. 154(b) by 155 days.

(21) Appl. No.: 15/190,044

(22) Filed: Jun. 22, 2016

(65) Prior Publication Data
US 2017/0367250 A1 Dec. 28, 2017

(51) Int. Cl.
| A01B 35/28 | (2006.01) |
| A01B 63/00 | (2006.01) |
| A01C 5/06 | (2006.01) |
| A01B 15/16 | (2006.01) |
| A01C 7/08 | (2006.01) |
| A01C 7/20 | (2006.01) |

(52) U.S. Cl.
CPC ............ *A01B 63/008* (2013.01); *A01B 15/16* (2013.01); *A01B 35/28* (2013.01); *A01C 5/064* (2013.01); *A01C 7/08* (2013.01); *A01C 7/206* (2013.01)

(58) Field of Classification Search
CPC ........... A01B 5/04; A01B 15/00; A01B 35/28; A01B 35/32; A01B 63/002; A01C 5/064

USPC ................. 172/315, 324, 326, 663
See application file for complete search history.

(56) References Cited

U.S. PATENT DOCUMENTS

| 5,316,088 A | * | 5/1994 | Ries | A01B 35/16 172/156 |
| 5,544,709 A | * | 8/1996 | Lowe | A01B 35/32 172/624.5 |
| 8,393,407 B2 | * | 3/2013 | Freed | A01B 35/16 111/141 |
| 2017/0142897 A1 | * | 5/2017 | Hagny | A01C 7/205 |

* cited by examiner

*Primary Examiner* — Gary S Hartmann
(74) *Attorney, Agent, or Firm* — Jeffrey L. Thompson; Thompson & Thompson, P.A.

(57) ABSTRACT

A down-pressure system for an agricultural implement has a linear actuator connected between a frame assembly and an opener assembly. A mounting structure for connecting the linear actuator to the opener assembly includes a bushing and an alignment member attached to the linear actuator. The bushing has protrusions extending transversely from opposite sides of a longitudinal axis of the linear actuator. Each protrusion has a curved engagement surface for engaging a flat surface on the opener assembly to prevent bending stresses on the linear actuator when the opener assembly is raised and lowered. The alignment member is arranged to lock the bushing into a predetermined rotational position about a longitudinal axis of the linear actuator relative to the opener assembly. The alignment member comprises a first structure that mates with a corresponding structure on the bushing, and a second structure that engages opposite sides of the opener assembly.

19 Claims, 7 Drawing Sheets

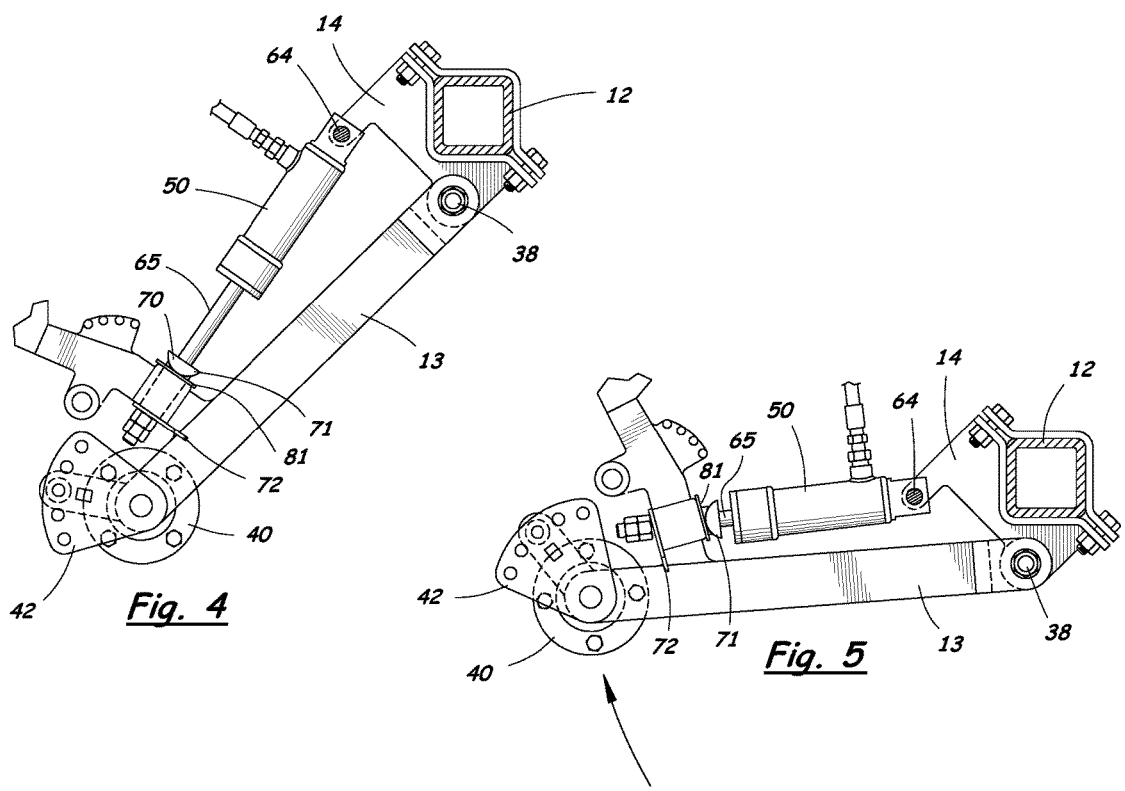

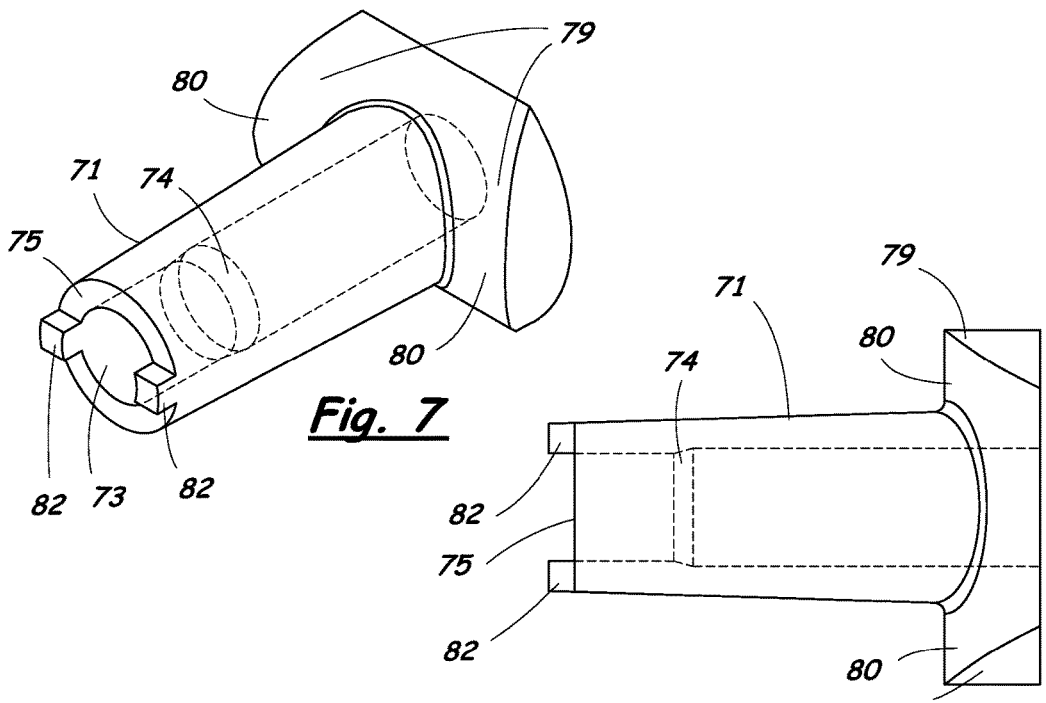
Fig. 7
Fig. 8
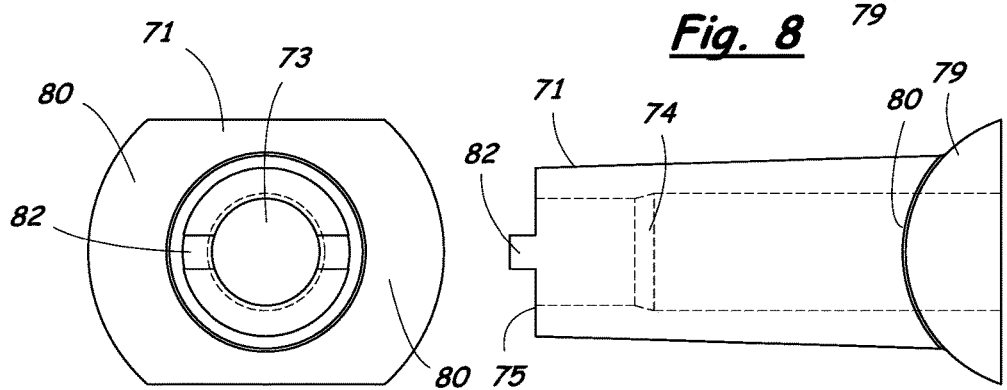
Fig. 10
Fig. 9
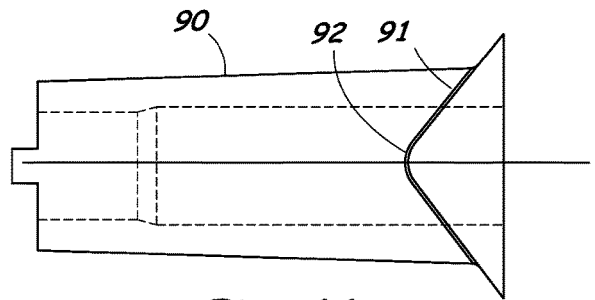
Fig. 11

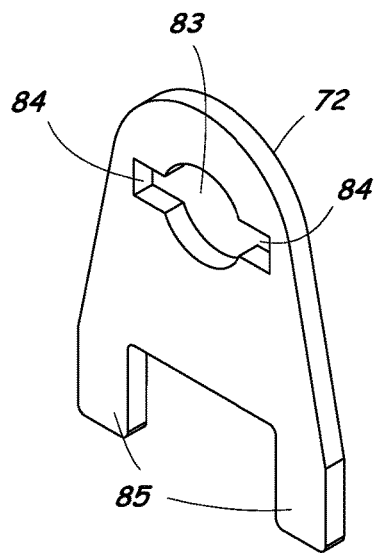 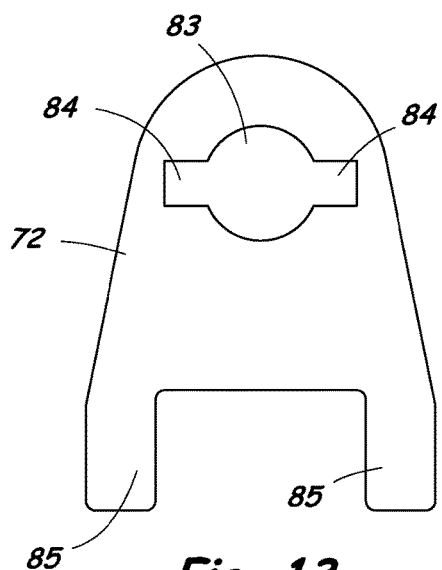 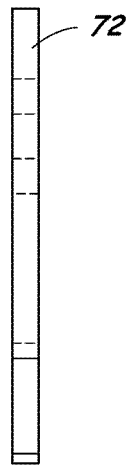
*Fig. 12*  *Fig. 13*  *Fig. 14*
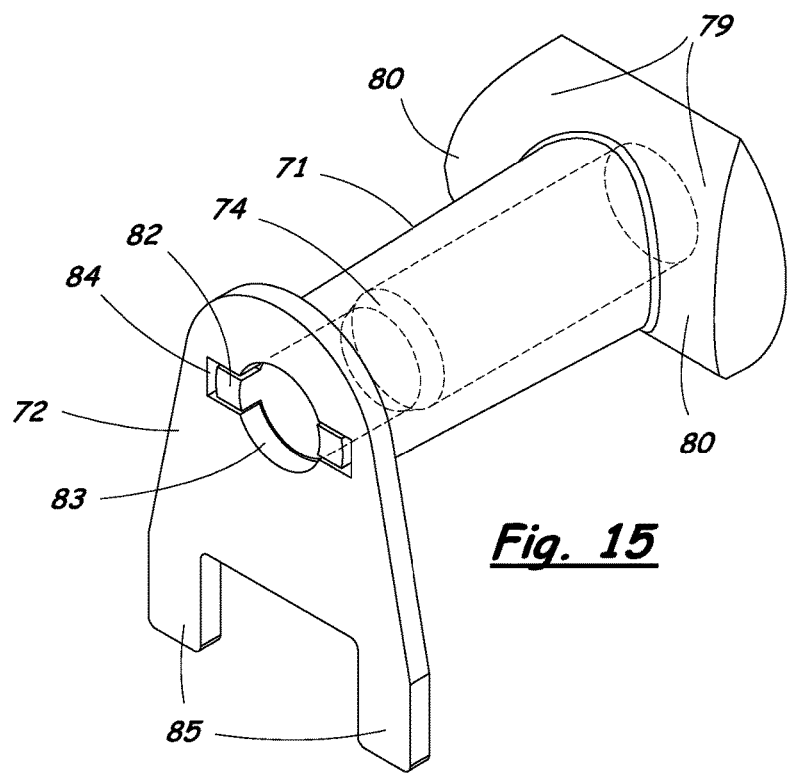
*Fig. 15*

MOUNTING STRUCTURE FOR DOWN-PRESSURE SYSTEM FOR OPENER ASSEMBLY OF AGRICULTURAL IMPLEMENT

BACKGROUND OF THE INVENTION

Field of the Invention

The present invention relates generally to opener assemblies for agricultural implements, and in particular, to a mounting structure for a down-pressure system for use with opener assemblies of an agricultural implement.

Description of the Prior Art

Agricultural seeders used in no-till farming practices require openers with down-pressure systems that provide a relatively high downforce for adequate ground penetration. An example of such openers is shown in U.S. Pat. No. 4,760,806 issued to Bigbee et al. This type of opener, commercially available on John Deere xx50, xx60, and xx90-series grain drills, has a down-pressure spring that compresses to apply a downforce to the opener.

A seed drill opener assembly 10 having a conventional down-pressure system 11 is illustrated in FIG. 1. A rockshaft assembly 12 for raising and lowering the opener assembly 10 is arranged to pivot about a transverse horizontal axis. The rockshaft assembly 12 is rotatable between a first position in which the opener assembly 10 is raised for transport, and a second position in which the opener assembly 10 is lowered for engaging the soil.

The opener assembly 10 is mounted to the rockshaft assembly 12 by an opener arm 13. The opener arm 13 is pivotally connected to a mounting bracket 14 on the rockshaft assembly 12. The down-pressure system 11 provides a down-force on the opener assembly 10. The down-pressure system 11 includes a mechanical coil spring 15 connected between the mounting bracket 14 on the rockshaft assembly 12 and the opener assembly 10 (specifically, an extension of opener arm 13). The down-pressure system 11 shown in FIG. 1 is similar to the conventional down-pressure system disclosed in the '806 patent.

The conventional down-pressure system 11 provides an effective range of up and down movement of the opener assembly 10 that is less than desired in typical field conditions. The coil spring 15 compresses about 1 to 2.5 inches from being completely relaxed to what is optimal for normal field operation, depending on the down-pressure deployed (how much twist of the rockshaft hydraulically, and how much frame weight is available). The coil spring 15 can be compressed further if it strikes an obstacle or goes up over a big mound of soil. However, the coil spring 15 starts to relax in the smallest depression (due to the angles involved, an inch of compression or decompression of the coil spring 15 results in about 3.5 inches of opener up/down travel at the gauge wheel 16). As a result, the coil spring 15 becomes ineffective soon thereafter and no longer supplies enough downforce to keep the opener at the desired depth setting. The lack of adequate downforce results in seeds S that are too shallow or perhaps even on top of the soil surface and can also result in failure to cut stalks, stubble, and leaves (a.k.a. "residue" or mulch) lying on the soil surface (the so-called hairpinning of residue—folding and tucking the residue into the furrow F, instead of cutting it).

To help alleviate this problem, most drill operators will run more down-pressure, and add extra ballast to the frame/toolbar. This results in some of the openers across the width of the implement having far more downforce than necessary, in order to keep the majority of openers engaged in the soil. Even so, there are far too many instances where individual openers, or groups of openers, will not be cutting the stubble and the soil adequately. For example, if the opener is in a small depression (including wheel tracks in long-term no-till soil conditions) causing the spring to relax 25%, there will be an approximately 25% reduction in down-force on that opener, which often causes loss of depth consistency, and/or hairpinning. Seeds that are too shallow or are tucked into straw or stalks will often fail to establish, due to inadequate protection from drying out, or increased disease pressure, or predation. Plants thus weakened may be subject to winter-kill or winter-injury if the crop is an overwintering crop, such as winter wheat.

Down-pressure systems that use double-acting hydraulic cylinders to raise and lower opener assemblies are known in the prior art. For example, U.S. Pat. No. 5,724,902 issued to Janelle et al. discloses an agricultural seeder that uses a double-acting hydraulic cylinder to apply down-pressure to the opener assembly and to raise the opener assembly into a transport position.

A hydraulic down-pressure system for an implement having opener assemblies 21 mounted to a rockshaft 24 is described in Applicant's U.S. Patent Application No. 62/259,471 filed on Nov. 24, 2015, the content of which is incorporated herein by reference. An opener assembly 21 for this system is illustrated in FIG. 2 and includes an opener arm 13 and a furrow opener blade 37 (a.k.a. opener "disk"). The opener arm 13 has a first end 38 pivotally connected to a respective one of the mounting brackets 14, and a second end 39 supporting the furrow opener blade 37.

A down-pressure system 20 is associated with the opener assembly 21 to provide an adjustable and constant down-force on the opener blade 37. The down-pressure system 20 includes a linear actuator 50 having a first end 51 pivotally connected to the mounting bracket 14, and a second end 52 connected to the opener assembly 21. The linear actuator 50 is a single-action hydraulic cylinder with a port 53 connected to a source of pressurized hydraulic fluid that forces a piston rod of the cylinder 50 in an extended direction to apply downforce to the opener assembly 21. The first end 51 of the hydraulic actuator 50 is spaced from the first end 38 of the opener arm 13 so that changing the length of the hydraulic actuator 50 causes the opener arm 13 to pivot relative to the mounting bracket 14. This arrangement also allows the pressure applied to extend the hydraulic actuator 50 to be transferred to the opener assembly 21 as a downward biasing force on the opener assembly 21.

However, under some operating conditions, an excessive amount of bending force may be imparted to the rod 65 of the hydraulic cylinder 50. The bending force is caused by the cylinder 50 not being parallel to the main arm 13 of the opener.

There is a need for an improved down-pressure system for use with seed drill opener assemblies, and particularly a hydraulic down-pressure system having a mounting structure that minimizes bending stresses on the actuator.

SUMMARY OF THE INVENTION

An object of the present invention is to provide an improved down-pressure system for use with seed drills and other agricultural implements.

A further object of the present invention is to provide a mounting structure for a hydraulic down-pressure system that minimizes bending stresses on the hydraulic actuator.

A further object of the present invention is to provide a down-pressure system that can be retrofitted to existing implements in place of OEM mechanical spring down-pressure systems.

A further object of the present invention is to provide a down-pressure system for opener assemblies that increases a range of movement of the opener assembly while maintaining a consistent and uniform downforce on the opener assembly.

To accomplish these and other objects of the invention, a down-pressure system for an agricultural implement is provided having a linear actuator connected between a frame assembly and an opener assembly. A mounting structure for connecting the linear actuator to the opener assembly includes a bushing and an alignment member attached to the linear actuator. The bushing has protrusions extending transversely from opposite sides of a longitudinal axis of the linear actuator. Each protrusion has a curved engagement surface for engaging a flat surface on the opener assembly to prevent bending stresses on the linear actuator when the opener assembly is raised and lowered. The alignment member is arranged to lock the bushing into a predetermined rotational position about a longitudinal axis of the linear actuator relative to the opener assembly. The alignment member comprises a first structure that mates with a corresponding structure on the bushing, and a second structure that engages opposite sides of the opener arm 13.

According to one aspect of the present invention, an agricultural implement is provided, comprising: a frame assembly adapted for forward movement over a field; an opener assembly comprising an opener arm and a furrow opener, the opener arm having a first end pivotally connected to the frame assembly at a first connection point, and a second end supporting the furrow opener; and a down-pressure system for adjustably biasing the opener assembly. The down-pressure system comprises a linear actuator having a first actuator end connected to the frame assembly and a second actuator end connected to the opener assembly by a mounting structure. The mounting structure comprises a bushing attached to the linear actuator, the bushing having at least one protrusion with a curved engagement surface facing a flat surface on a top side of the opener assembly for engaging the flat surface on the opener assembly to impart a downforce on the opener assembly without imparting bending stresses on the linear actuator.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIGS. 4 and 5 are side views of the implement frame showing the rockshaft, opener arm, and hydraulic down-pressure system with the opener arm illustrated in a lowered position (FIG. 4) and a raised position (FIG. 5).

FIGS. 7 to 10 are perspective, top, side and end views, respectively, of a bushing used in the mounting structure of the present invention.

FIG. 11 is a side view of a bushing according to another embodiment for use in the mounting structure of the present invention.

FIGS. 12 to 14 are perspective, top and side views, respectively, of a flange used in the mounting structure of the present invention.

FIG. 15 is a perspective view of the bushing and flange of the mounting structure assembled together.

DETAILED DESCRIPTION OF THE INVENTION

Figure 3:
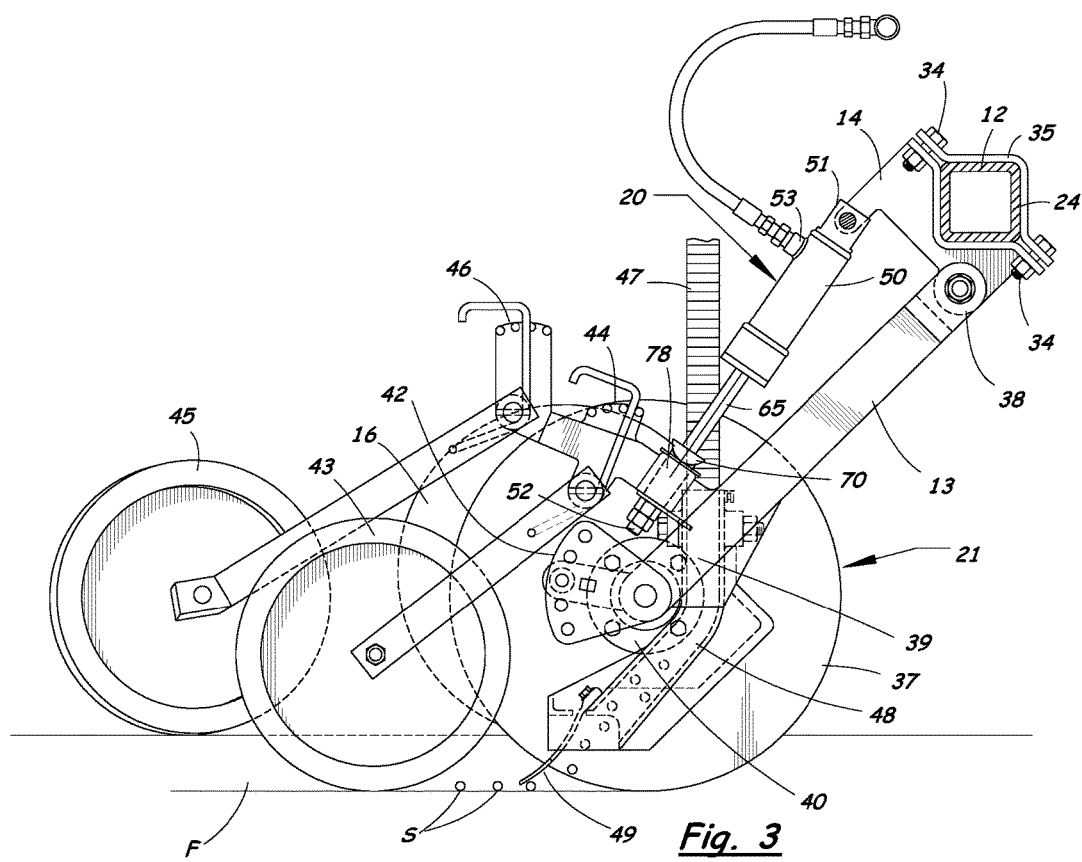
FIG. 3 is a side view of a seed drill opener assembly with a hydraulic down-pressure system and a mounting structure that minimizes bending stresses on the hydraulic actuator.
Figure 6:
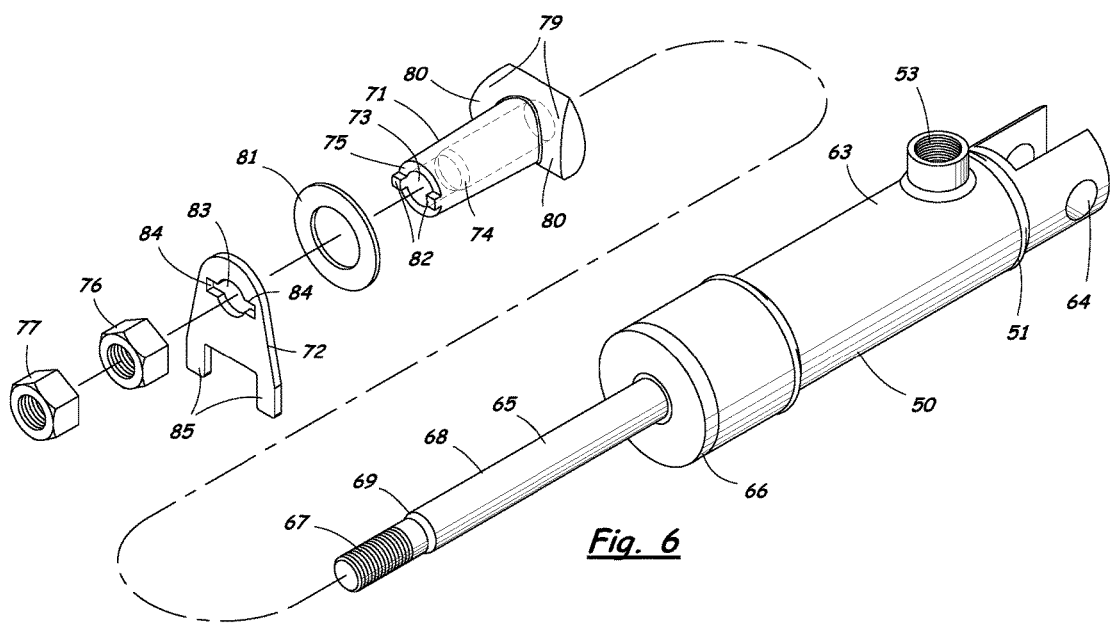
FIG. 6 is an exploded perspective view of a mounting structure for one of the single-action hydraulic cylinders used in the down-pressure system of the present invention.

A mounting structure 70 for a down-pressure system 20 of an agricultural implement with opener assemblies 21 according to the present invention will now be described in detail with reference to FIGS. 3 to 15 of the accompanying drawings.

The agricultural implement includes a frame assembly adapted for forward movement over a field. A hitch structure (not shown) is provided at the front of the frame assembly, and a plurality of transport wheels (not shown) are provided to support the frame assembly above the ground.

The frame assembly includes a rockshaft assembly 12, also sometimes referred to as a "torque tube," which is arranged to pivot about a transverse horizontal axis. The rockshaft assembly 12 may be in the form of a heavy square metal tube 24, as shown in cross section in FIG. 3. A double-acting hydraulic cylinder (not shown) is used to rotate the rockshaft assembly 12 between a first position (FIG. 5) in which opener assemblies 21 are raised for transport, and a second position (FIG. 4) in which the opener assemblies 21 are lowered for engaging the soil.

The implement includes a plurality of opener assemblies 21 arranged in spaced relationship across the width of the implement. The opener assemblies 21 are mounted to respective mounting brackets 14 attached to the rockshaft 12. The mounting brackets 14 are each attached to the tube 24 of the rockshaft 12 using four threaded fasteners 34 and a clamping structure 35.

Each of the opener assemblies 21 includes an opener arm 13 and a furrow opener blade 37 (a.k.a. opener "disk"). The opener arm 13 has a first end 38 pivotally connected to a respective one of the mounting brackets 14 on the rockshaft tube 24, and a second end 39 supporting a hub 40 on which the furrow opener blade 37 is mounted. The opener blade 37 is arranged to operate at a slight angle to the direction of travel to cut a furrow F in the soil as the implement moves through the field. Alternatively, a pair of blades 37 may be arranged to create furrow F. A gauge wheel 16 is supported for rotation adjacent to the opener blade 37 to limit the blade 37 to a desired depth of operation. An adjustment mechanism 42 is provided for adjusting the gauge wheel 16 vertically with respect to the opener blade 37 to change the depth of operation.

A firming wheel 43 follows behind the opener blade 37 for firming the seeds S into soil in the bottom of the furrow F created by the opener blade 37 to provide good seed-to-soil contact in the furrow F. A firming adjustment mechanism 44 allows the downforce on the firming wheel 43 to be adjusted.

A closing wheel 45 follows behind the firming wheel 43 for crushing the side of the furrow F to provide a layer of soil over the seeds S deposited in the furrow F. A closing adjustment mechanism 46 allows the downforce on the closing wheel 45 to be adjusted.

A seed tube 47 and seed boot 48 are provided for directing seeds S downwardly and rearwardly into the furrow F created by the opener blade 37. A seed bounce flap 49 is attached to trail below and/or behind the seed boot 48 for preventing seeds S from bouncing out of the furrow F as they are being deposited.

A down-pressure system 20 is associated with each of the opener assemblies 21 to provide an adjustable and uniform downforce on the opener blade 37. The down-pressure system 20 includes a linear actuator 50 having a first end 51 pivotally connected to a respective one of the mounting brackets 14 on the rockshaft tube 24, and a second end 52 connected to the opener assembly 21.

In the illustrated embodiment, the linear actuator 50 is a single-action hydraulic cylinder. The single-action cylinder 50 has a port 53 connected to a source of pressurized hydraulic fluid that forces the single-action hydraulic cylinder 50 in an extended direction to apply downforce to the opener assembly 21. In an alternative embodiment, the linear actuator 50 can be a double-acting hydraulic cylinder.

The first end 51 of the hydraulic actuator 50 is spaced from the first end 38 of the opener arm 13 so that changing the length of the hydraulic actuator 50 causes the opener arm 13 to pivot relative to the mounting bracket 14. This arrangement also allows the pressure applied to extend the hydraulic actuator 50 to be transferred to the opener assembly 21 as a downward biasing force on the opener assembly 21.

The down-pressure system 20 of the present invention has been described above as being used in an agricultural seeding drill. However, the down-pressure system 20 may also be used with other implements having opener assemblies, such as fertilizer applicators and the like.

Figure 1:
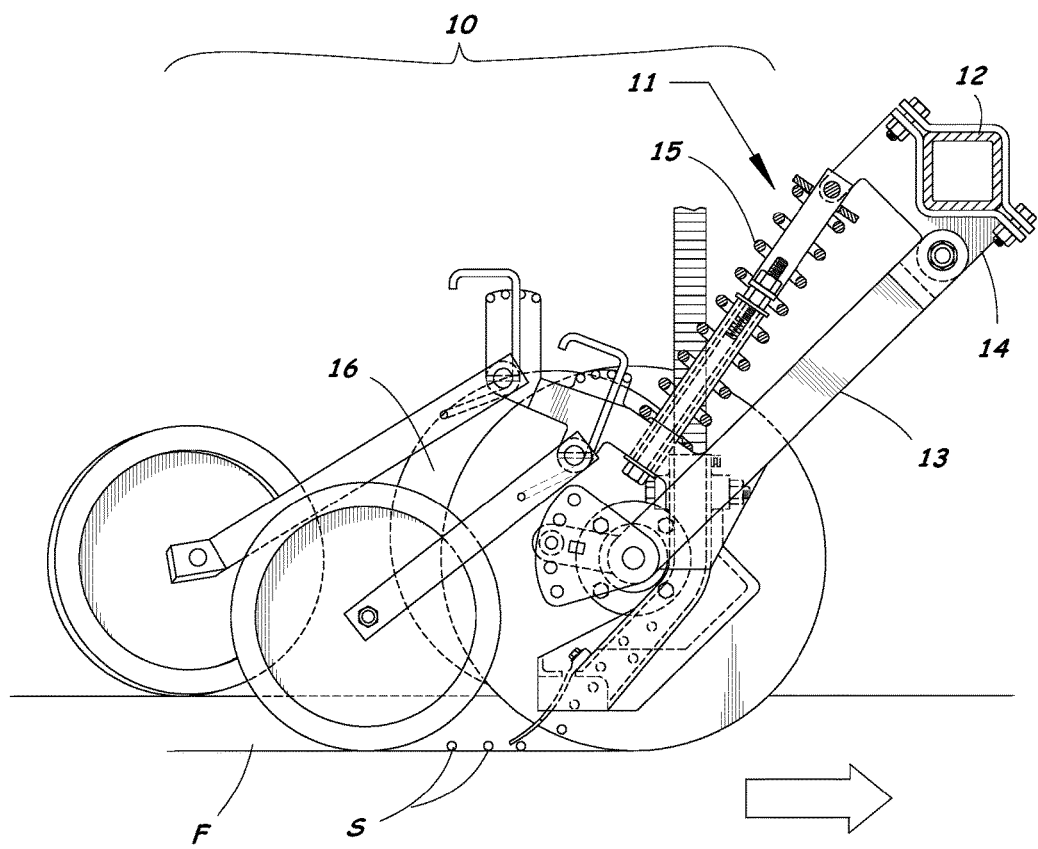
FIG. 1 is a side view of a prior art seed drill opener assembly mounted to an adjustable rockshaft with a mechanical spring for applying downforce.
Figure 2:
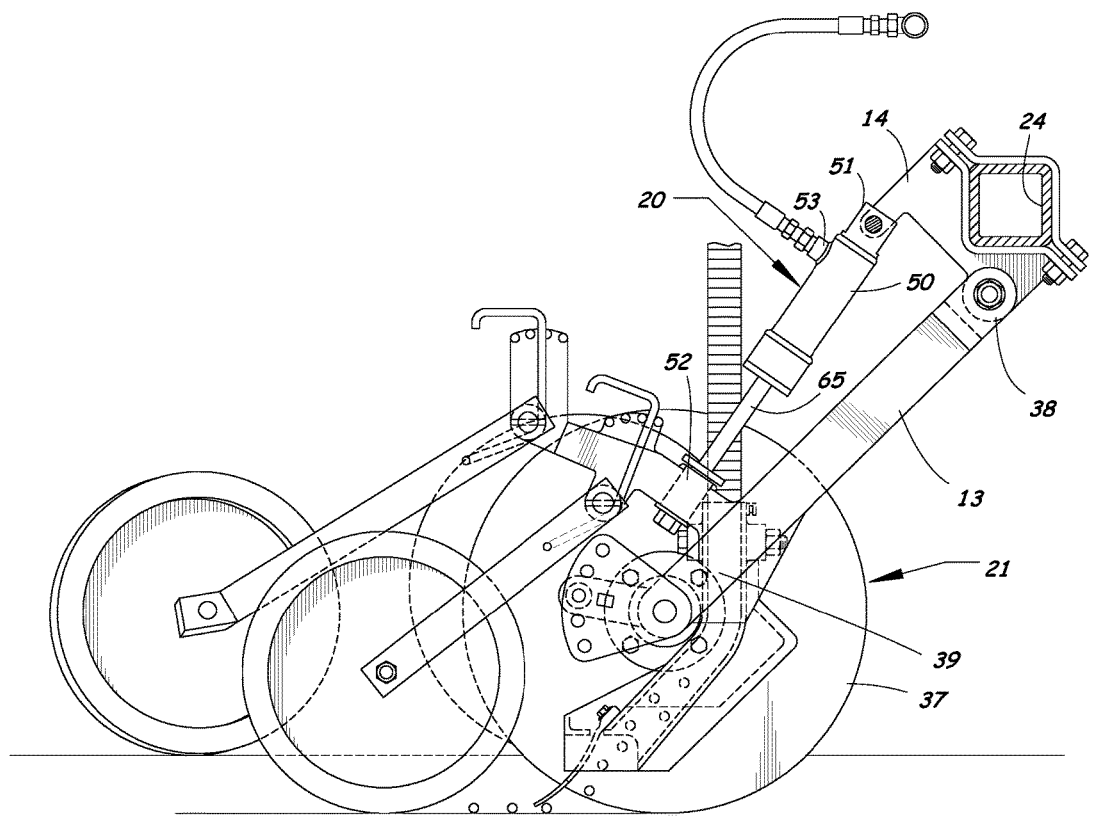
FIG. 2 is a side view of a seed drill opener assembly with a single-action hydraulic cylinder connected between an adjustable rockshaft and the opener assembly, as described in Applicant's copending application.

As explained above, an embodiment of the present invention uses single-action cylinders 50 as down-pressure systems 20 on the individual opener assemblies 21. A suitable single-action cylinder 50 for this purpose is described in Applicant's Application No. 62/259,471 filed on Nov. 24, 2015. The single-action cylinder has pin openings 64 formed at the first end 51 of the cylindrical housing 63 (FIG. 6) for connecting to the mounting bracket 14 (FIGS. 2-5). A plunger rod 65 protrudes from the second end 66 of the cylindrical housing 63 for connecting to the opener assembly 21.

The plunger rod 65 of the linear actuator 50 has a second actuator end connected to the opener assembly 21 by the mounting structure 70 (FIG. 4). The mounting structure 70 includes a bushing 71 and an alignment member 72 attached to the plunger rod 65. The plunger rod 65 includes a threaded end portion 67, a cylindrical shaft portion 68, and a shoulder 69 between the threaded end portion 67 and the cylindrical shaft portion 68. The plunger rod 65 extends through a longitudinal bore 73 of the bushing 71 until the shoulder 69 of the plunger rod 65 engages a corresponding annular surface 74 within the bushing 71. The threaded end portion 67 of the plunger rod 65 extends out of the bottom side 75 of the bushing 71. The bushing 71 is secured to the rod 65 by means of a press-fit, sometimes reinforced with adhesive compount.

A first threaded nut 76 (FIG. 6) mates with the threaded end portion 67 of the plunger rod 65 to secure the mounting structure 70. A second nut 77 can be used as a locking jam nut to lock the first threaded nut 76 against rotation on the threaded end portion 67. The alignment member 72 is sandwiched between the bottom side 75 of the bushing 71 and the first threaded nut 76 to connect the threaded actuator end 67 to the opener assembly 21.

The mounting structure 70 is assembled onto the opener assembly 21 by placing the bushing 71 into a mounting hole 78 (FIG. 3) in the opener assembly 21 from a top side of the mounting hole 78 until a bottom side 75 of the bushing 71 extends from the bottom of the mounting hole. The bushing 71 fits loosely in the mounting hole 78 in the opener assembly 21 so that it can rock within the mounting hole 78 as the opener assembly 21 moves between its raised and lowered positions.

The bushing 71 has a pair of protrusions 79 extending transversely from opposite sides of a longitudinal axis of the linear actuator 50. The protrusions 79 each have a respective curved engagement surface 80 for engaging a flat surface 81 on the opener assembly 21. The flat surface 81 is located on a top side of the opener assembly 21 and can be a flat washer, as shown in FIGS. 3 to 6. The flat washer 81 is sandwiched between the curved engagement surfaces 80 of the bushing 71 and the top side of the mounting hole 78 in the opener assembly 21. The curved engagement surfaces 80 of the bushing are convex in a direction facing the flat surface 81 on the opener assembly 21.

The curved engagement surfaces 80 in the illustrated embodiment in FIGS. 3 to 10 are horizontal cylindrical segments. The horizontal cylindrical segments are each shaped to correspond with a horizontal cylindrical segment cut from a cylinder having an axis of symmetry parallel with an axis of rotation of the opener arm 13 at its pivotal connection 38 to the frame assembly 12.

The first end 38 of the opener arm 13 is pivotally connected to the frame assembly 12 for rotation about a first transverse axis, and the first actuator end 51 of the linear actuator 50 is pivotally connected to the frame assembly for rotation about a second transverse axis 64 spaced from the first transverse axis. The curved engagement surfaces 80 on the bushing 71 comprise horizontal cylindrical segments having an axis of symmetry parallel with the first and second transverse axes of the opener arm 13 and linear actuator 50, respectively. The curved engagement surfaces 80 lie in an arc about a third transverse axis located above the curved engagement surfaces 80. The third transverse axis intersects a longitudinal axis of the linear actuator 50 between the bushing 71 and the first actuator end 51.

The alignment member 72 is placed in mating engagement with the bottom side 75 of the bushing 71 on the bottom side of the mounting hole 78 in the opener assembly 21. The bushing 71 has a pair of integral lugs 82 extending from its bottom side 75. The alignment member 72 comprises a plate with a bore 83 for receiving the threaded end 67 of the plunger rod 65, and a pair of cutouts 84 for receiving the lugs 82 on the bottom side of the bushing 71.

The lugs 82 of the bushing 71 are mated with the cutouts 84 in the alignment member 72 so that the bushing 71 is held in a fixed rotational position relative to the alignment member 72.

The alignment member 72 has a second structure comprising a pair of arms 85 that extend from the plate and are arranged to engage opposite sides of the opener arm 13. The alignment member 72 is arranged to lock the bushing 71 into a predetermined rotational position about a longitudinal axis of the linear actuator 50 relative to the opener assembly 21. The predetermined angular position is a position in which the protrusions 79 extend transverse to a direction of travel of the implement.

The curved engagement surfaces 80 on the bushing 71 allow a downforce to be imparted by the linear actuator 50 through the bushing 71 to the flat surface 81 on the opener assembly 21 without imparting bending stresses on the linear actuator 50. As the opener arm 13 is moved between its lowered position (FIG. 4) and its raised position (FIG. 5), the curved surface 80 of the bushing 71 will roll across the flat surface 81 on the opener assembly 21 to impart a downforce to the opener assembly 21. The curved surface 80 of the bushing 71 functions to eliminate or minimize any bending stresses on the linear actuator 50 when a downforce is applied to the opener assembly 21.

A bushing 90 according to another embodiment of the present invention is illustrated in FIG. 11. The bushing 90 has a pair of protrusions 91 extending transversely from opposite sides of the longitudinal axis of the bushing 90. The protrusions 91 each have a respective curved engagement surface 92 for engaging a flat surface 81 on the opener assembly 21. The curved engagement surface 92 has a smaller radius than the curved surface 80 of the bushing 71 illustrated in FIG. 9. The smaller radius curved surface 92 functions to minimize bending stresses on the linear actuator 50, similar to the curved surface 80 of the bushing 71 described above, but more effectively. The smaller radius curved surface 92 also has the advantage of keeping the longitudinal forces transferred from the bushing 90 to the opener assembly 21 more centered with the longitudinal axis of the linear actuator 50 as the opener assembly 21 is moved between its lowered and raised positions. The radius is ideally quite small (0.1 inch), within the constraints of materials used for bushing 71 and durability of flat surface 81.

While the invention has been specifically described in connection with specific embodiments thereof, it is to be understood that this is by way of illustration and not of limitation, and the scope of the appended claims should be construed as broadly as the prior art will permit.

What is claimed is:

1. An agricultural implement, comprising:
a frame assembly adapted for forward movement over a field;
an opener assembly comprising an opener arm and a furrow opener, said opener arm having a first end pivotally connected to said frame assembly at a first connection point, and a second end supporting said furrow opener;
a down-pressure system for adjustably biasing the opener assembly, said down-pressure system comprising a linear actuator, said linear actuator having a first actuator end connected to said frame assembly at a second connection point; and
said linear actuator has a second actuator end connected to said opener assembly by a mounting structure, said mounting structure comprises a bushing attached to said linear actuator, said bushing having at least one protrusion with a curved engagement surface facing a flat surface on a top side of said opener assembly for engaging the flat surface on said opener assembly to impart a downforce on said opener assembly without imparting bending stresses on said linear actuator.

2. The agricultural implement according to claim 1, wherein said at least one protrusion comprises a pair of protrusions extending transversely from opposite sides of a longitudinal axis of said linear actuator, each protrusion comprising a respective curved engagement surface for engaging a flat surface on said opener assembly.

3. The agricultural implement according to claim 2, wherein each of said curved engagement surfaces comprises a horizontal cylindrical segment.

4. The agricultural implement according to claim 1, wherein said curved engagement surface comprises a horizontal cylindrical segment.

5. The agricultural implement according to claim 1, wherein said curved engagement surface is shaped to correspond with a horizontal cylindrical segment cut from a cylinder having an axis of symmetry parallel with an axis of rotation of the opener arm at its pivotal connection to said frame assembly.

6. The agricultural implement according to claim 1, wherein said first end of said opener arm is pivotally connected to said frame assembly for rotation about a first transverse axis, said first actuator end of said linear actuator is pivotally connected to said frame assembly for rotation about a second transverse axis spaced from said first transverse axis, and said curved engagement surface comprises a horizontal cylindrical segment having an axis of symmetry parallel with said first and second transverse axes.

7. The agricultural implement according to claim 1, wherein said curved engagement surface is convex in a direction facing the flat surface on said opener assembly.

8. The agricultural implement according to claim 1, wherein said curved engagement surface lies in an arc about a transverse axis located above said lower end of said bushing.

9. The agricultural implement according to claim 1, wherein said first end of said opener arm is pivotally connected to said frame assembly for rotation about a first transverse axis, said first actuator end of said linear actuator is pivotally connected to said frame assembly for rotation about a second transverse axis spaced from said first transverse axis, and said curved engagement surface lies in an arc about a third transverse axis parallel with said first and second transverse axes.

10. The agricultural implement according to claim 9, wherein said third transverse axis intersects a longitudinal axis of said linear actuator.

11. The agricultural implement according to claim 1, wherein said flat surface on said opener assembly is a flat washer.

12. The agricultural implement according to claim 1, wherein said mounting structure further comprises an alignment member arranged to lock said bushing into a predetermined rotational position about a longitudinal axis of said linear actuator relative to said opener assembly.

13. The agricultural implement according to claim 12, wherein said alignment member comprises a first structure that mates with a corresponding structure on said bushing, and a second structure that engages the opener arm.

14. The agricultural implement according to claim 12, wherein said at least one protrusion comprises a pair of protrusions extending transversely from opposite sides of a longitudinal axis of said linear actuator, and said predetermined rotational position of said bushing is a position in which said protrusions extend transverse to a direction of travel of the implement.

15. The agricultural implement according to claim 12, wherein said bushing has a bottom side with a pair of integral lugs, and wherein said alignment member comprises a plate with a bore and a pair of cutouts for receiving said lugs on the bottom side of the bushing, and a pair of arms that extend from the plate and are arranged to engage opposite sides of the opener arm.

16. The agricultural implement according to claim 12, wherein said second actuator end of said linear actuator comprises a threaded rod that extends through a longitudinal bore of said bushing, a mounting hole in said opener assembly, and the bore in said alignment member, and wherein said alignment member is sandwiched between the bushing and a threaded nut that mates with said threaded rod to connect said second actuator end to said opener assembly.

17. The agricultural implement according to claim 1, wherein said frame assembly includes a rockshaft assembly arranged to pivot about a transverse horizontal axis, and said first end of said opener arm is pivotally connected to said rockshaft assembly at said first connection point, and said first actuator end of said linear actuator is connected to said rockshaft assembly at said second connection point.

18. In an agricultural implement having a frame assembly adapted for forward movement over a field, and an opener assembly having an opener arm with a first end pivotally connected at a first connection point to said frame assembly and a second end supporting a furrow opener, an adjustable down-pressure system for rotatably biasing the opener arm, the down-pressure system comprising:

a hydraulic linear actuator having a first actuator end connected to said frame assembly at a second connection point spaced from said first connection point, and a second actuator end placed in a mounting hole of said opener assembly and connected to said opener assembly by a mounting structure, said mounting structure comprising a bushing attached to said linear actuator, said bushing having at least one protrusion with a curved engagement surface facing a flat surface on a top side of said opener assembly for engaging the flat surface on said opener assembly to impart a downforce on said opener assembly without imparting bending stresses on said linear actuator.

19. In an agricultural seed drill having a frame assembly adapted for forward movement over a field, an opener assembly having an opener arm and a furrow opener, said opener arm having a first end pivotally connected to the frame assembly and a second end supporting the furrow opener, and a down-pressure system for adjustably biasing the opener arm, the down-pressure system comprising:

a hydraulic linear actuator having a first actuator end connected to said frame assembly at a second connection point spaced from said first connection point, and a second actuator end placed in a mounting hole of said opener assembly and connected to said opener assembly by a mounting structure, said mounting structure comprising a bushing attached to said linear actuator, said bushing having at least one protrusion with a curved engagement surface facing a flat surface on a top side of said opener assembly for engaging the flat surface on said opener assembly to impart a downforce on said opener assembly without imparting bending stresses on said linear actuator.

* * * * *